(12) United States Patent
Wang et al.

(10) Patent No.: US 9,996,220 B2
(45) Date of Patent: Jun. 12, 2018

(54) MULTI-ZONE INTERFACE SWITCHING METHOD AND DEVICE

(75) Inventors: Wenyong Wang, Shenzhen (CN); Jun Jin, Shenzhen (CN)

(73) Assignee: ZTE Corporation, Shenzhen, Guangdong (CN)

( * ) Notice: Subject to any disclaimer, the term of this patent is extended or adjusted under 35 U.S.C. 154(b) by 1025 days.

(21) Appl. No.: 14/366,381

(22) PCT Filed: Jun. 19, 2012

(86) PCT No.: PCT/CN2012/077167
§ 371 (c)(1),
(2), (4) Date: Jul. 23, 2014

(87) PCT Pub. No.: WO2013/091364
PCT Pub. Date: Jun. 27, 2013

(65) Prior Publication Data
US 2015/0135124 A1    May 14, 2015

(30) Foreign Application Priority Data
Dec. 22, 2011 (CN) .......................... 2011 1 0434482

(51) Int. Cl.
*G06F 3/048* (2013.01)
*G06F 3/0482* (2013.01)
(Continued)

(52) U.S. Cl.
CPC .......... *G06F 3/0482* (2013.01); *G06F 3/0481* (2013.01); *H04M 1/72544* (2013.01)

(58) Field of Classification Search
CPC ............................. G06F 3/0481; G06F 3/0482
See application file for complete search history.

(56) References Cited

U.S. PATENT DOCUMENTS 5,677,708 A * 10/1997 Matthews, III ....... G06F 3/0482
                                                        348/E5.104
5,717,929 A *  2/1998 Furukawa ................. G06T 1/00
                                                        348/744
(Continued)

FOREIGN PATENT DOCUMENTS

CN         1738367 A     2/2006
CN       101231571 A     7/2008
(Continued)

OTHER PUBLICATIONS

Supplementary European Search Report in European application No. 12859202.9, dated May 18, 2015.
(Continued)

*Primary Examiner* — Linh K Pham
(74) *Attorney, Agent, or Firm* — Oppedahl Patent Law Firm LLC

(57) ABSTRACT

Disclosed is a multi-zone interface switching device, comprising: a special-effect adding module configured for establishing a special effect information list using a plurality of set special effect zones, a special effect style and a special effect frame number of each special effect zone, and providing the special effect information list to the special-effect calculating module; a special-effect controlling module configured for sending, upon receiving an instruction to perform an interface switching operation, the special-effect calculating module a notification to calculate a switching picture; and a special-effect calculating module configured for calculating, after receiving the notification to calculate a switching picture sent by the special-effect controlling module, a switching picture to be displayed in each special effect zone using the special effect information list in the special-effect adding module. Also disclosed is a multi-zone interface switching method. With the disclosure, it is possible to
(Continued)

provide an interface switching solution with natural transition and rich forms.

5 Claims, 2 Drawing Sheets

(51) Int. Cl.
*H04M 1/725* (2006.01)
*G06F 3/0481* (2013.01)

(56) References Cited

U.S. PATENT DOCUMENTS

| | | | | |
|---|---|---|---|---|
| 8,907,888 B2* | 12/2014 | Hasegawa | ......... | H04M 1/72583 345/156 |
| 9,141,260 B2* | 9/2015 | McCann | ............ | G06F 3/0481 |
| 2003/0077002 A1* | 4/2003 | Silverstein | ......... | H04N 21/2662 382/282 |
| 2003/0117440 A1* | 6/2003 | Hellyar | ............ | G06F 3/0235 715/767 |
| 2004/0085328 A1* | 5/2004 | Maruyama | ......... | G06F 3/0481 345/619 |
| 2004/0165010 A1* | 8/2004 | Robertson | ............ | G06F 3/0481 715/805 |
| 2006/0161847 A1* | 7/2006 | Holecek | ............ | G06F 3/0481 715/716 |
| 2007/0288860 A1* | 12/2007 | Ording | ............ | G06F 3/04842 715/779 |
| 2008/0084504 A1 | 4/2008 | Nakamura | | |
| 2009/0197635 A1* | 8/2009 | Kim | ............ | G06F 3/0346 455/550.1 |
| 2012/0133899 A1* | 5/2012 | Chiang | ............ | H04N 9/3111 353/31 |
| 2013/0044087 A1* | 2/2013 | Hsu | ............ | G06F 3/1415 345/204 |
| 2013/0187934 A1* | 7/2013 | Kim | ............ | G06T 1/00 345/501 |
| 2015/0135124 A1* | 5/2015 | Wang | ............ | H04M 1/72544 715/778 |

FOREIGN PATENT DOCUMENTS

| | | |
|---|---|---|
| CN | 101416488 A | 4/2009 |
| CN | 101895634 A | 11/2010 |

OTHER PUBLICATIONS

International Search Report in international application No. PCT/CN2012/077167, dated Oct. 4, 2012.
English Translation of the Written Opinion of the International Search Authority in international application No. PCT/CN2012/077167, dated Oct. 4, 2012.

* cited by examiner

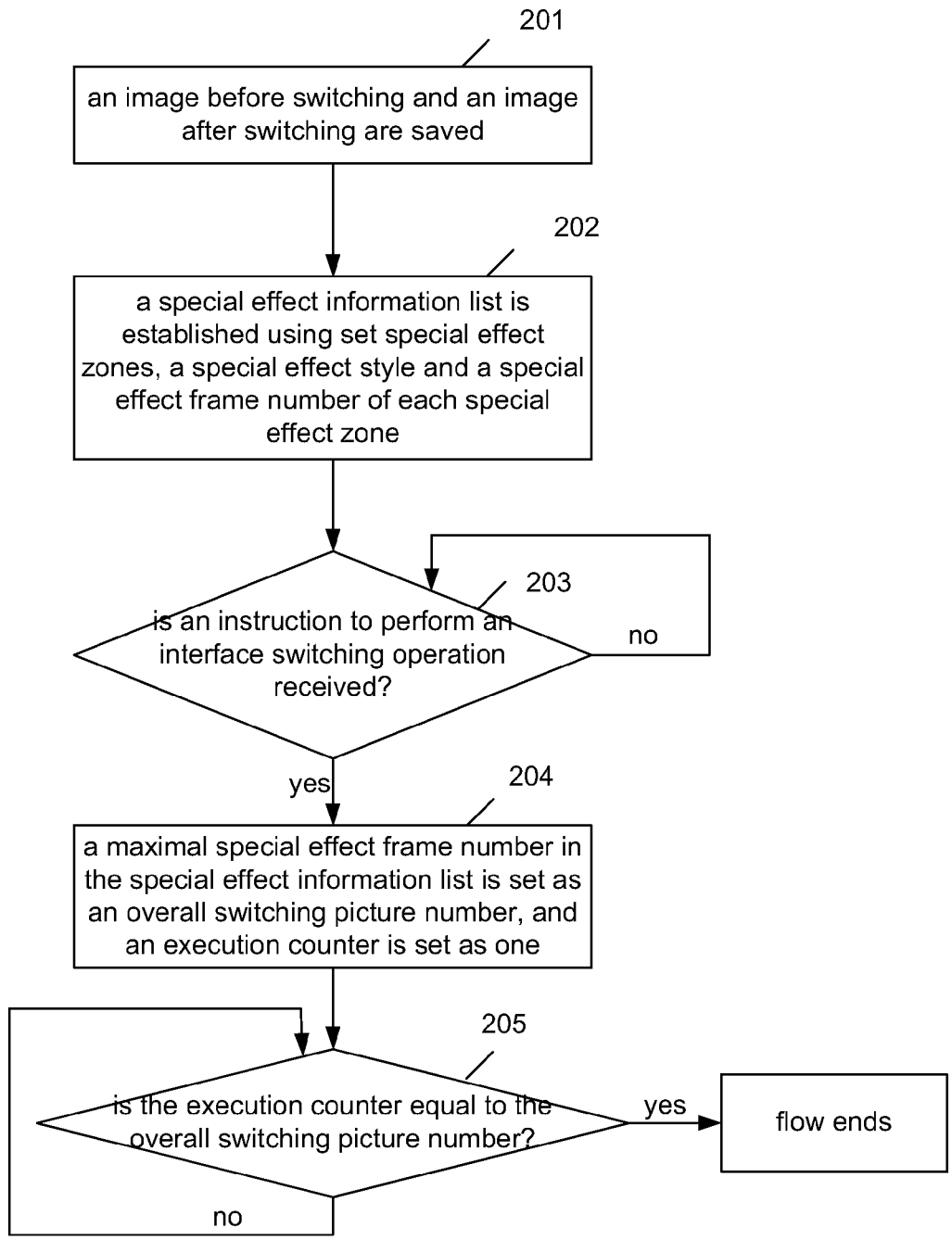

ical field

MULTI-ZONE INTERFACE SWITCHING METHOD AND DEVICE

TECHNICAL FIELD

The disclosure relates to display control technology in the field of mobile communication, and particularly to a multi-zone interface switching method and device.

BACKGROUND

With fast development of electronic technology, there is a wide use of various embedded terminals with display equipments, in particular terminals with interfaces for human-computer interaction, such as mobile phones, tablet computers, electronic books, Global Positioning Systems (GPS). Such terminals are frequently used. However, during interface switching of such terminals, an interface is displayed directly without processing or transition, such that a user experiences sudden and unnatural interface switching.

Currently, with some terminals, simple transition during interface switching, such as colour change, distortion, enlargement, rotation, is displayed, which improves visual experience in terminal usage to a certain degree. However, such monotonic interface switching fails to meet a user requirement for diversified displaying solutions during the interface switching operation.

It can be seen that an existing method fails to provide a solution for multi-zone interface switching in a display equipment of a terminal, thereby failing to provide an interface switching solution with natural transition and rich forms.

SUMMARY

In view of the above, it is desired that embodiments of the disclosure provide a multi-zone interface switching method and device, capable of providing an interface switching solution with natural transition and rich forms.

To this end, a technical solution according to the disclosure is implemented as follows.

The disclosure provides a multi-zone interface switching device, including a special-effect adding module, a special-effect controlling module and a special-effect calculating module, wherein the special-effect adding module is configured for establishing a special effect information list using a plurality of set special effect zones, a special effect style and a special effect frame number of each special effect zone, and providing the special effect information list to the special-effect calculating module;

the special-effect controlling module is configured for sending, upon receiving an instruction to perform an interface switching operation, the special-effect calculating module a notification to calculate a switching picture; and the special-effect calculating module is configured for calculating, after receiving the notification to calculate a switching picture sent by the special-effect controlling module, a switching picture to be displayed in each special effect zone using the special effect information list in the special-effect adding module.

In an embodiment, the special-effect calculating module is configured for: setting a maximal special effect frame number in the special effect information list as an overall switching picture number, and setting an execution counter as one; calculating a switching picture to be displayed in each special effect display zone to be displayed in a current switching frame, and increasing the execution counter by one; determining whether the execution counter is equal to the overall switching picture number; and when the execution counter is not equal to the overall switching picture number, continuing to calculate a switching picture to be displayed in each special effect display zone to be displayed in a next frame, and increasing the execution counter by one, or when the execution counter is equal to the overall switching picture number, performing no operation.

In an embodiment, the special-effect calculating module is configured for: determining whether a switching picture has to be calculated for each special effect zone; when a switching picture has to be calculated for a special effect zone, calculating the switching picture about to be displayed in the special effect zone, and increasing a switching picture counter of the special effect zone by one, or when no switching frame has to be calculated for a special effect zone, calculating no switching frame; and after calculation is done for all special effect zones, forming the current switching frame to be displayed by any switching picture about to be displayed in a special effect zone.

In an embodiment, the device further includes an image-resource setting module configured for providing the special-effect calculating module with an image before switching and an image after switching, where the special-effect calculating module is configured for: calling a locally pre-stored calculating method corresponding to a special effect style of the special effect zone recorded in the special effect information list, and calculating the switching picture about to be displayed in the special effect zone with the calculating method corresponding to the special effect style of the special effect zone using the switching picture counter of the special effect zone, the special effect frame number and the special effect style of the special effect zone in the special effect information list, and the image before switching and the image after switching in the image-resource setting module.

In an embodiment, the special-effect adding module is further configured for testing validity of a set special effect zone, and adding a valid special effect zone in the special effect information list.

In an embodiment, the special-effect adding module, the special-effect controlling module, the special-effect calculating module and the image-resource setting module are installed in an equipment with an interface for human-computer interaction.

The disclosure further provides a multi-zone interface switching method, including steps of:

establishing a special effect information list using a plurality of set special effect zones, a special effect style and a special effect frame number of each special effect zone; and upon receiving an instruction to perform an interface switching operation, calculating a switching picture to be displayed in each special effect zone according to the special effect information list.

In an embodiment, the step of calculating a switching picture to be displayed in each special effect zone according to the special effect information list includes:

setting a maximal special effect frame number in the special effect information list as an overall switching picture number, and setting an execution counter as one; and calculating a switching picture to be displayed in each special effect display zone to be displayed in a current switching frame, and increasing the execution counter by one; determining whether the execution counter is equal to the overall switching picture number; and when the execution counter is not equal to the overall switching picture number, continuing to calculate a switching picture to be displayed in each special effect display zone to be displayed in a next switching frame, and increasing the execution counter by one, or ending the flow when the execution counter is equal to the overall switching picture number.

In an embodiment, the step of calculating a switching picture to be displayed in each special effect display zone to be displayed in a current switching frame includes:

determining whether a switching picture has to be calculated for each special effect zone; when a switching picture has to be calculated for a special effect zone, calculating the switching picture about to be displayed in the special effect zone, and increasing a switching picture counter of the special effect zone by one, or when no switching frame has to be calculated for a special effect zone, calculating no switching frame; and after calculation is done for all special effect zones, forming the current switching frame to be displayed by any switching picture about to be displayed in a special effect zone.

In an embodiment, the step of calculating the switching picture about to be displayed in the special effect zone includes: calling a locally pre-stored calculating method corresponding to a special effect style of the special effect zone recorded in the special effect information list, and calculating the switching picture about to be displayed in the special effect zone with the calculating method corresponding to the special effect style of the special effect zone using the switching picture counter of the special effect zone, the special effect frame number and the special effect style of the special effect zone in the special effect information list, and an image before switching and an image after switching.

In an embodiment, the step of establishing a special effect information list using a plurality of set special effect zones, a special effect style and a special effect frame number of each special effect zone includes: testing validity of a set special effect zone, and adding a valid special effect zone in the special effect information list.

The multi-zone interface switching method and device provided by the disclosure have advantages and features that: various special effects are presented in multiple non-overlapping zones according to a plurality of user-set special effect zones as well as a special effect style and a special effect frame number of each special effect zone. Moreover, multiple special effect styles may be pre-set in the multi-zone interface switching device, thereby providing an interface switching solution with more natural transition and richer forms and significantly improving visual experience of a user.

BRIEF DESCRIPTION OF THE DRAWINGS

FIG. 2 is a flowchart of a multi-zone interface switching method according to the disclosure.

DETAILED DESCRIPTION

Figure 1:
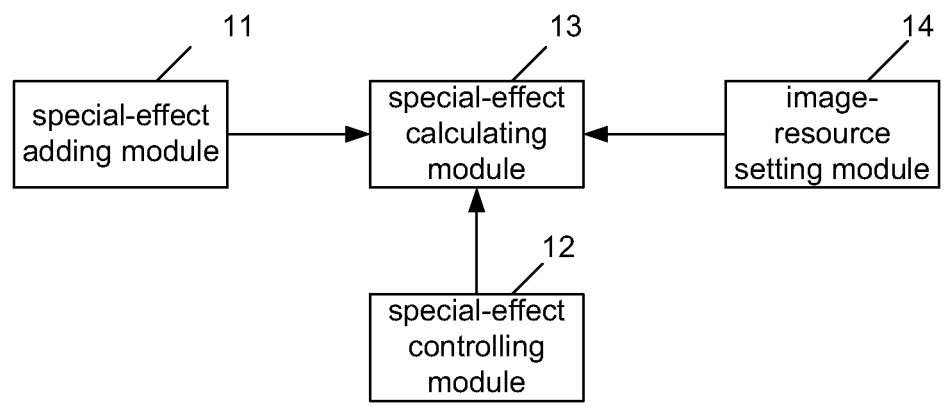
FIG. 1 is a schematic diagram of a structure of a multi-zone interface switching device according to the disclosure.

According to embodiments of the disclosure, a special effect information list is established using a plurality of set special effect zones, a special effect style and a special effect frame number of each special effect zone; and once an instruction to perform an interface switching operation is received, a switching picture to be displayed is calculated according to the special effect information list.

The disclosure is further elaborated with reference to drawings and specific embodiments.

The disclosure provides a multi-zone interface switching device, as shown in FIG. 1. The device includes a special-effect adding module 11, a special-effect controlling module 12 and a special-effect calculating module 13.

The special-effect adding module 11 is configured for establishing a special effect information list using a plurality of set special effect zones, a special effect style and a special effect frame number of each special effect zone, and providing the special effect information list to the special-effect calculating module 13.

The special-effect controlling module 12 is configured for sending, upon receiving an instruction to perform an interface switching operation, the special-effect calculating module 13 a notification to calculate a switching picture.

The special-effect calculating module 13 is configured for calculating, after receiving the notification to calculate a switching picture sent by the special-effect controlling module 12, a switching picture to be displayed in each special effect zone using the special effect information list in the special-effect adding module 11.

The device may further include an image-resource setting module 14 for saving an image before switching and an image after switching.

The image before switching and the image after switching may be user-selected. The images may be selected from a gallery in an accessed system by a user, where a format of the images may be jpg.

The special-effect adding module 11 may be configured for establishing the special effect information list using user-set special effect zones, a user-selected special effect style of each special effect zone, and user-set special effect frame numbers received;

Each entry of the special effect information list may include a special effect zone, a special effect style within the special effect zone, and a special effect frame number of the special effect zone. The special effect information list may be established using an existing doubly linked list.

A special effect zone is a rectangular zone divided according to user-set coordinates of a lower-left corner and an upper-right corner of a display interface; the lower-left corner of the display interface may be taken as the origin of two-dimensional coordinates (X, Y); specifically, a special effect zone is denoted by {lower-left x, lower-left y; upper-right x, upper-right y}; where the coordinates are set according to a resolution of a display equipment of the accessed system; for example, when the resolution of the display equipment of the accessed system is 240×400, three special effect zones are set, respectively with coordinates of display interfaces of {0, 0; 240, 133}, {0, 134; 240, 267} and {0, 268; 240, 400}.|

A special effect style is pre-set, with an existing specific special effect implementing method which will not be repeated herein. The special effect may include flying toward the left, rotation and the like; for instance, three special effect zones are set, respectively with styles of flying from left to right, flying from right to left, and flying from left to right.

A special effect frame number is a user-specified number of switching frames to be displayed in displaying the special effect and accomplishing the special effect style of a special effect zone.

The special-effect adding module 11 may be specifically configured for interacting with a display interaction module of the accessed system and receiving a user operation sent from the display interaction module.

The special-effect controlling module 12 may be specifically configured for determining whether an instruction to perform an interface switching operation is received; sending, when such an instruction is received, the special-effect calculating module 13 a notification to calculate a switching picture, or continuing to determine whether an instruction to perform an interface switching operation is received.

The special-effect controlling module 12 may be specifically configured for determining whether an instruction sent by the accessed system is an instruction to perform an interface switching operation, where when an interface switching operation is to be performed in the accessed system, an instruction to perform an interface switching operation will be generated inside the accessed system; once the instruction to perform an interface switching operation is detected, interface switching is initiated, or if no instruction to perform an interface switching operation is detected, interface switching is not performed.

The instruction to perform an interface switching operation may be generated inside the accessed system according to a requirement of existing technology, using a specific generating method which is not repeated here.

The special-effect calculating module 13 is specifically configured for extracting the special effect information list in the special-effect adding module 11, selecting the maximal special effect frame number in the special effect information list, setting the maximal special effect frame number as the overall switching picture number, and setting the execution counter as one; setting a switching picture counter for each special effect zone in the special effect information list, and setting the switching picture counter of each special effect as one.

The special-effect calculating module 13 may be specifically configured for: calculating a switching picture to be displayed in a current switching frame, and increasing the execution counter by one; determining whether the execution counter is equal to the overall switching picture number; and when the execution counter is not equal to the overall switching picture number, continuing to calculate a switching picture to be displayed in a next switching frame, and increasing the execution counter by one, or when the execution counter is equal to the overall switching picture number, deleting locally saved switching information in displaying the current switching operation and ending the flow, wherein the locally saved switching information may include a switching picture counter, the execution counter; the special effect frame number of the special effect zone, the overall switching picture number, and each calculated switching picture to be displayed.

The special-effect calculating module 13 may be specifically configured for: when calculating a switching picture to be displayed in the current switching frame, determining whether a switching picture has to be calculated for each special effect zone; when a switching picture has to be calculated for a special effect zone, calculating the switching picture about to be displayed in the special effect zone, and increasing the switching picture counter of the special effect zone by one, or when no switching frame has to be calculated for a special effect zone, calculating no switching frame; and after calculation is done for all special effect zones, forming the current switching frame to be displayed by any switching picture about to be displayed in a special effect zone.

The special-effect calculating module 13 may be specifically configured for determining whether a switching picture has to be calculated for each special effect zone, and performing determination on all special effect zones in the special effect information list with a formula:

switching picture counter==execution counter*special effect frame number in special effect zone/overall switching picture number;

when the result given by the formula is 1, it is determined that a switching picture has to be calculated for the special effect zone.

The special-effect calculating module 13 may be specifically configured for: calling a locally pre-stored calculating method corresponding to a special effect style of the special effect zone recorded in the special effect information list, and calculating the switching picture about to be displayed in the special effect zone with the calculating method corresponding to the special effect style of the special effect zone using the switching picture counter of the special effect zone, the special effect frame number and the special effect style of the special effect zone in the special effect information list, and the image before switching and the image after switching in the image-resource setting module 14; the image-resource setting module 14 may be further configured for providing the special-effect calculating module 13 with an image before switching and an image after switching.

The special-effect calculating module 13 may be specifically configured for saving a pre-set switching picture calculating method corresponding to a special effect style; the pre-set calculating method is existing technology, and is not repeated here.

For example, assume that there are three special effect zones A, B, C respectively with special effect frame numbers 5, 7, 10. Then, the overall switching picture number is 10, the execution counter is set to be 1.

The special-effect calculating module 13 initiates switching picture counters of all special effect zones A, B, C as 1; according to the formula, 1==1*5/10 gives 0, i.e. no switching picture has to be calculated for the special effect zone A; 1==1*7/10 gives 0, i.e. no switching picture has to be calculated for the special effect zone B; 1==1*10/10 gives 1, i.e. a switching picture has to be calculated for the special effect zone C, then a switching picture is calculated for the special effect zone C and a picture displayed in C is updated; the switching picture counter of the special effect zone C is increased by one; such determination and calculation continues until the execution counter is equal to the overall switching picture number, and then the flow ends.

The special-effect adding module 11 may be further configured for testing validity of a user-set special effect zone, and adding a valid special effect zone in the special effect information list.

The special-effect adding module 11 may be specifically configured for determining whether a special effect zone currently set by the user is a special effect zone recorded in the special effect information list; when the special effect zone currently set by the user is a special effect zone recorded in the special effect information list, replacing content of the special effect zone recorded in the special effect information list by the special effect zone currently set by the user and saving the list; when the special effect zone currently set by the user does not cover, but overlaps with, an original special effect zone recorded in the special effect information list, determining that the special effect zone currently set by the user is invalid; and when the special effect zone currently set by the user is not related to any special effect zone recorded in the special effect information list, determining that the special effect zone currently set by the user is valid.

The interface switching device may be installed, as a module, on an existing equipment with an interface for human-computer interaction, such as a mobile phone, a tablet computer and the like. In the multi-zone interface switching device:

the special-effect adding module 11 is connected to the display interaction module of a system actually accessed, and receives a user-set special effect zone, a user-selected special effect style of each special effect zone, and a user-set special effect frame number;

the image-resource setting module 14 receives a picture sent by the accessed system; and will perform, when the multi-zone interface switching device accesses the system for the first time, an initial test specifically by testing whether remaining memory space of the accessed system is enough for saving two pictures corresponding to the resolution of the display interaction equipment of the accessed system; when there are enough memory space, initialization is successful, and then the user is informed to select the image before switching and the image after switching via the display interaction module of the accessed system, or when there are not enough memory space, the initialization fails and no operation is performed;

a switching picture to be displayed in each special effect zone finally calculated by the special-effect calculating module 13 is sent to the display interaction module of the actually-accessed system so as to be displayed.

A multi-zone interface switching method according to the disclosure, as shown in FIG. 2, includes steps as follows.

In step 201, an image before switching and an image after switching are saved in a multi-zone interface switching device.

In step 202, a special effect information list is established using set special effect zones, a special effect style and a special effect frame number of each special effect zone set in the multi-zone interface switching device.

Here, a special effect zone is a rectangular zone divided according to user-set coordinates of a lower-left corner and an upper-right corner of a display interface; the lower-left corner of the display interface may be taken as the origin of two-dimensional coordinates (X, Y); specifically, a special effect zone is denoted by {lower-left x, lower-left y; upper-right x, upper-right y}; where the coordinates are set according to a resolution of a display equipment of the accessed system; for example, when the resolution of the display equipment of the accessed system is 240×400, three special effect zones are set, respectively with coordinates of display interfaces of {0, 0; 240, 133}, {0, 134; 240, 267} and {0, 268; 240, 400}.

A special effect style is pre-set, with an existing specific special effect implementing method which will not be repeated herein. The special effect may include flying toward the left, rotation and the like; for instance, three special effect zones are set, respectively with styles of flying from left to right, flying from right to left, and flying from left to right.

A special effect frame number is a user-specified number of switching frames to be displayed in displaying the special effect and accomplishing the special effect style of a special effect zone.

Each entry of the special effect information list may include a special effect zone, a special effect style within the special effect zone, and a special effect frame number of the special effect zone. The special effect information list may be established using an existing doubly linked list.

In step 203, the multi-zone interface switching device determines whether an instruction to perform an interface switching operation is received, and performs step 204 when such an instruction is received, or repeats step 203 when such an instruction is not received.

Here, the multi-zone interface switching device determines whether an instruction to perform an interface switching operation is received by determining whether an instruction sent by the accessed system is an instruction to perform an interface switching operation, where when an interface switching operation is to be performed in the accessed system, an instruction to perform an interface switching operation will be generated inside the accessed system; once the instruction to perform an interface switching operation is detected, interface switching is initiated, or if no instruction to perform an interface switching operation is detected, interface switching is not performed. The instruction to perform an interface switching operation may be generated inside the accessed system according to a requirement of existing technology, using a specific generating method which is not repeated here.

In step 204: the multi-zone interface switching device sets a maximal special effect frame number in the special effect information list as an overall switching picture number, and sets an execution counter as one.

Specifically, the multi-zone interface switching device extracts the special effect information list in the special-effect adding module 11, selects the maximal special effect frame number in the special effect information list, sets the maximal special effect frame number as the overall switching picture number, and sets the execution counter as one; sets a switching picture counter for each special effect zone in the special effect information list, and sets the switching picture counter of each special effect as one.

Step 205: the multi-zone interface switching device calculates a switching picture to be displayed in each special effect display zone to be displayed in a current switching frame, and increases the execution counter by one; determines whether the execution counter is equal to the overall switching picture number; and when the execution counter is not equal to the overall switching picture number, repeats step 205, or when the execution counter is equal to the overall switching picture number, ends the processing flow.

Here, the multi-zone interface switching device calculates a switching picture to be displayed in each special effect display zone to be displayed in a current switching frame by: determining whether a switching picture has to be calculated for each special effect zone; when a switching picture has to be calculated for a special effect zone, calculating the switching picture about to be displayed in the special effect zone, and increasing the switching picture counter of the special effect zone by one, or when no switching frame has to be calculated for a special effect zone, calculating no switching frame; and after calculation is done for all special effect zones, forming the current switching frame to be displayed by any switching picture about to be displayed in a special effect zone.

The multi-zone interface switching device determines whether a switching picture has to be calculated for each special effect zone with a formula:

switching picture counter=execution counter*special effect frame number in special effect zone/overall switching picture number;

when the result given by the formula is 1, it is determined that a switching picture has to be calculated for the special effect zone.

The multi-zone interface switching device calculates the switching picture about to be displayed in the special effect zone by: calling a locally pre-stored calculating method corresponding to a special effect style of the special effect zone recorded in the special effect information list, and calculating the switching picture about to be displayed in the special effect zone with the calculating method corresponding to the special effect style of the special effect zone using the switching picture counter of the special effect zone, the special effect frame number and the special effect style of the special effect zone in the special effect information list, and the image before switching and the image after switching in the image-resource setting module.

Additionally, before step 201, the multi-zone interface switching device may perform initialization specifically by testing, when the multi-zone interface switching device accesses a system for the first time, whether remaining memory space of the accessed system is enough for saving two pictures corresponding to the resolution of the display interaction equipment of the accessed system; when there are enough memory space, initialization is successful, and then step 201 is performed, or when there are not enough memory space, the initialization fails and the processing flow ends.

In establishing the special effect information list in step 202, it is further required to test validity of a user-set special effect zone, and a valid special effect zone may be added in the special effect information list. Specifically, it is determined whether a special effect zone currently set by the user is a special effect zone recorded in the special effect information list; when the special effect zone currently set by the user is a special effect zone recorded in the special effect information list, content of the special effect zone recorded in the special effect information list is replaced by the special effect zone currently set by the user and the list is saved; when the special effect zone currently set by the user does not cover, but overlaps with, an original special effect zone recorded in the special effect information list, it is determined that the special effect zone currently set by the user is invalid; and when the special effect zone currently set by the user is not related to any special effect zone recorded in the special effect information list, it is determined that the special effect zone currently set by the user is valid.

In step 205, the multi-zone interface switching device sends a calculated switching picture to be displayed to the display interaction module of the actually-accessed system so as to be displayed. Furthermore, after step 205 is performed, when multi-zone switching is displayed, the multi-zone interface switching device further needs to delete locally saved switching information in displaying the current switching operation and ends the flow, wherein the locally saved switching information may include a switching picture counter, the execution counter; the special effect frame number of the special effect zone, the overall switching picture number, and each calculated switching picture to be displayed.

What described are merely embodiments of the disclosure, and are not intended to limit the scope of the disclosure.

The invention claimed is:

1. A multi-zone interface switching device, comprising:
   a processor; and
   memory storing instructions executable by the processor, wherein the processor is configured for:
   establishing a special effect information list using a plurality of set special effect zones, a special effect style and a special effect frame number of each of the set special effect zones;
   receiving setting of a special effect zone input by a user;
   determining whether the special effect zone set by the user is a special effect zone recorded in the special effect information list;
   when the special effect zone set by the user is a special effect zone recorded in the special effect information list, replacing content of the special effect zone recorded in the special effect information list by the special effect zone set by the user and saving the special effect information list;
   when the special effect zone set by the user does not cover, but overlaps with, a special effect zone recorded in the special effect information list, determining that the special effect zone set by the user is invalid;
   when the special effect zone set by the user is related to no special effect zone recorded in the special effect information list, adding the special effect zone set by the user in the special effect information list;
   receiving an instruction to perform an interface switching operation;
   setting a maximal special effect frame number in the special effect information list as an overall switching picture number;
   setting an execution counter as one;
   setting a switching picture counter for each special effect zone in the special effect information list as one;
   for a current switching frame determining whether a switching picture has to be calculated for a special effect zone by determining whether a result given by a formula is 1, the formula being: the switching picture counter of the special effect zone=the execution counter * the special effect frame number of the special effect zone/the overall switching picture number;
   when the result is 1, calculating the switching picture about to be displayed in the special effect zone, and increasing the switching picture counter of the special effect zone by one;
   otherwise when the result is not 1, calculating no switching picture;
   after calculation is done for all special effect zones, forming the current switching frame to be displayed by any switching picture about to be displayed in a special effect zone;
   increasing the execution counter by one;
   determining whether the execution counter is equal to the overall switching picture number;
   when the execution counter is not equal to the overall switching picture number, continuing to calculate a switching picture to be displayed in a next switching frame;
   otherwise when the execution counter is equal to the overall switching picture number, deleting locally saved switching information in displaying the current switching operation and ending the flow, wherein the locally saved switching information comprises at least one of a switching picture counter, the execution counter, a special effect frame number of a special effect zone, the overall switching picture number, and a calculated switching picture.

2. The device according to claim 1,
   wherein the processor is configured for calculating the switching picture about to be displayed in the special effect zone by: calling a locally pre-stored calculating method corresponding to a special effect style of the special effect zone recorded in the special effect information list, and calculating the switching picture about to be displayed in the special effect zone with the calculating method corresponding to the special effect style of the special effect zone using the switching picture counter of the special effect zone, the special effect frame number and the special effect style of the special effect zone in the special effect information list, and an image before switching and an image after switching.

3. The device according to claim 1, wherein the device is equipped with an interface for human-computer interaction.

4. A multi-zone interface switching method, comprising:
establishing a special effect information list using a plurality of set special effect zones, a special effect style and a special effect frame number of each of the set special effect zones;
receiving setting of a special effect zone input by a user;
determining whether the special effect zone set by the user is a special effect zone recorded in the special effect information list;
when the special effect zone set by the user is a special effect zone recorded in the special effect information list, replacing content of the special effect zone recorded in the special effect information list by the special effect zone set by the user and saving the special effect information list;
when the special effect zone set by the user does not cover, but overlaps with, a special effect zone recorded in the special effect information list determining that the special effect zone set by the user is invalid;
when the special effect zone set by the user is related to no special effect zone recorded in the special effect information list, adding the special effect zone set by the user in the special effect information list;
receiving an instruction to perform an interface switching operation;
setting a maximal special effect frame number in the special effect information list as an overall switching picture number;
setting an execution counter as one;
setting a switching picture counter for each special effect zone in the special effect information list as one;
for a current switching frame, determining whether a switching picture has to be calculated for a special effect zone by determining whether a result given by a formula is 1, the formula being: the switching picture counter of the special effect zone=the execution counter * the special effect frame number of the special effect zone/the overall switching picture number;
when the result is 1, calculating the switching picture about to be displayed in the special effect zone, and increasing the switching picture counter of the special effect zone by one;
otherwise when the result is not 1 calculating no switching picture;
after calculation is done for all special effect zones, forming the current switching frame to be displayed by any switching picture about to be displayed in a special effect zone;
increasing the execution counter by one;
determining whether the execution counter is equal to the overall switching picture number;
when the execution counter is not equal to the overall switching picture number continuing to calculate a switching picture to be displayed in a next switching frame;
otherwise when the execution counter is equal to the overall switching picture number, deleting locally saved switching information in displaying the current switching operation and ending the flow, wherein the locally saved switching information comprises at least one of a switching picture counter, the execution counter, a special effect frame number of a special effect zone, the overall switching picture number, and a calculated switching picture.

5. The method according to claim 4, wherein the calculating the switching picture about to be displayed in the special effect zone comprises: calling a locally pre-stored calculating method corresponding to a special effect style of the special effect zone recorded in the special effect information list, and calculating the switching picture about to be displayed in the special effect zone with the calculating method corresponding to the special effect style of the special effect zone using the switching picture counter of the special effect zone, the special effect frame number and the special effect style of the special effect zone in the special effect information list, and an image before switching and an image after switching.

* * * * *